(12) United States Patent
Ahn et al.

(10) Patent No.: US 9,199,397 B2
(45) Date of Patent: Dec. 1, 2015

(54) INJECTION MOLDED CASE HAVING ANTENNA PATTERN AND MANUFACTURING METHOD THEREOF

(75) Inventors: Hae-Won Ahn, Gyeongsangbuk-do (KR); Jae-Ho Oh, Gyeongsangbuk-do (KR); Jeong-Woon Koo, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 953 days.

(21) Appl. No.: 13/183,747

(22) Filed: Jul. 15, 2011

(65) Prior Publication Data

US 2012/0056798 A1 Mar. 8, 2012

(30) Foreign Application Priority Data

Sep. 7, 2010 (KR) ........................ 10-2010-0087421

(51) Int. Cl.
| | |
|---|---|
| *H01Q 1/40* | (2006.01) |
| *B29C 45/14* | (2006.01) |
| *H01Q 1/24* | (2006.01) |
| *B29C 45/00* | (2006.01) |
| *B29K 705/00* | (2006.01) |
| *B29L 31/34* | (2006.01) |

(52) U.S. Cl.
CPC ..... *B29C 45/14639* (2013.01); *B29C 45/14065* (2013.01); *H01Q 1/243* (2013.01); *B29C 45/006* (2013.01); *B29C 45/14311* (2013.01); *B29C 45/14778* (2013.01); *B29C 2045/14327* (2013.01); *B29K 2705/00* (2013.01); *B29L 2031/3431* (2013.01); *B29L 2031/3456* (2013.01); *B29L 2031/3481* (2013.01)

(58) Field of Classification Search
USPC ................................... 343/702, 700 MS, 873
See application file for complete search history.

(56) References Cited

U.S. PATENT DOCUMENTS

| | | | |
|---|---|---|---|
| 2006/0232484 A1 | 10/2006 | Wulff et al. | |
| 2008/0040913 A1* | 2/2008 | Baba | ................. 29/601 |
| 2009/0322629 A1* | 12/2009 | Hung et al. | .................. 343/702 |
| 2010/0039347 A1 | 2/2010 | Chen et al. | |
| 2012/0056798 A1* | 3/2012 | Ahn et al. | ..................... 343/873 |

\* cited by examiner

*Primary Examiner* — Hoang V Nguyen
*Assistant Examiner* — Hai Tran
(74) *Attorney, Agent, or Firm* — Cha & Reiter, LLC.

(57) ABSTRACT

An injection-molded case and a manufacturing method thereof having antenna patterns are formed in the injection-molded case by only one insert injection molding process, without a second insert injection molding process as required in the conventional manufacture. The injection-molded case preferably includes: one or more antenna patterns fabricated by a press process; and an injection-molded case part having the antenna patterns provided therewithin, which is fabricated by fixing the antenna patterns on an injection mold and carrying out only one insert injection molding process.

7 Claims, 12 Drawing Sheets

INJECTION MOLDED CASE HAVING ANTENNA PATTERN AND MANUFACTURING METHOD THEREOF

CLAIM OF PRIORITY

This application claims priority from an application entitled "Injection Molded Case Having Antenna Pattern and Manufacturing Method Thereof" filed in the Korean Intellectual Property Office on Sep. 7, 2010, and assigned Serial No. 10-2010-0087421, the contents of which are hereby incorporated by reference in its entirety.

BACKGROUND OF THE INVENTION

1. Field of the Invention

The present invention relates to an injection-molded case and a manufacturing method thereof. More particularly, the present invention relates to an injection molded case and manufacturing method in which antenna patterns are formed in the injection-molded case.

2. Description of the Related Art

In general, "a portable communication device" refers to a device with which a user performs wireless communications with another party. Such a portable communication device generally includes an HHP, a CT-2 cellular phone, a digital phone, a PCS phone, a PDA, etc., and can be further classified into various types of devices according to the appearance. For example, a wireless terminal is classified into one of a bar-type, flip-type, folder-type, and slide-type of wireless terminals according to appearance. The above enumerated conventional portable communication devices are necessarily provided with an antenna device, a data input/output device, and a data transmitting/receiving device. Naturally, as the data input device, a keypad through which data can be input mainly by a finger-pressing operation is generally used.

Portable communication devices have become smaller and lighter with each generation of devices. Accordingly, an antenna device applied to the portable communication device also has become smaller, and an internal antenna which can be embedded in the communication device has become the typical antenna used in such devices, whereas a few years back users had antennas physically extending from the portable communication device.

Figure 1:
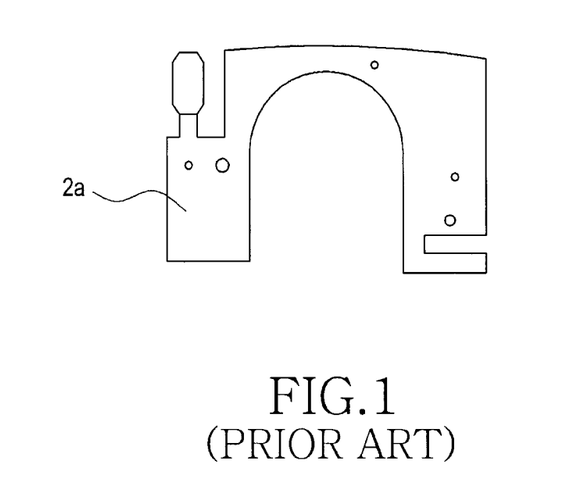
FIG. 1 is a view illustrating a conventional antenna pattern fabricated by a press process.
Figure 2:
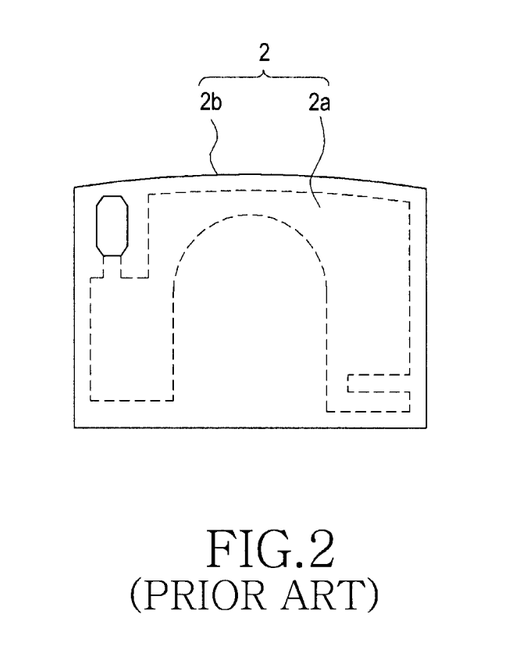
FIG. 2 is a view illustrating a state where a conventional antenna pattern is formed on an injection-molded article by a first insert injection molding process.
Figure 3:
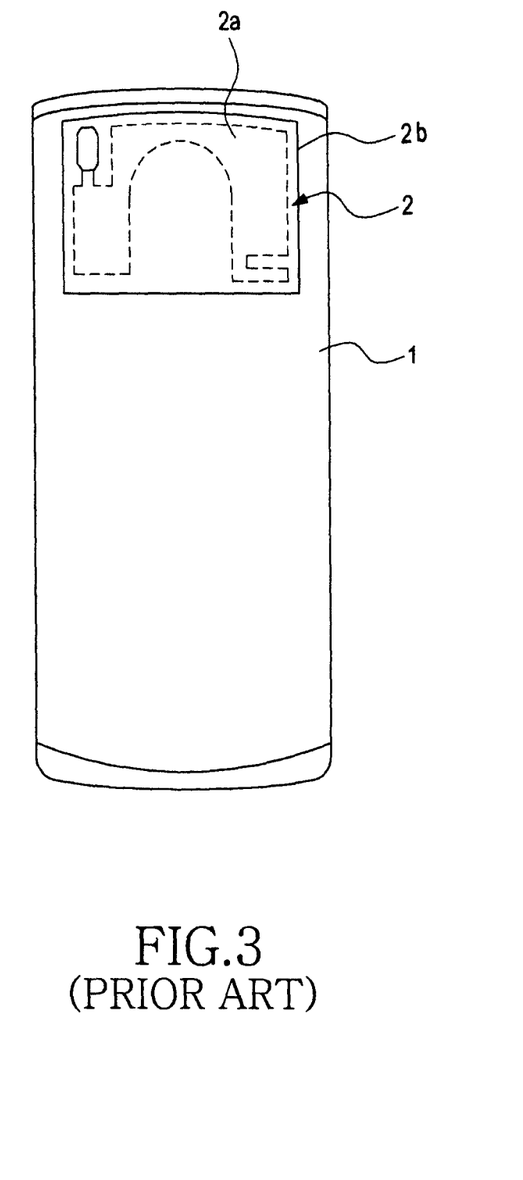
FIG. 3 is a view illustrating a state where a conventional injection-molded article formed by a first insert injection molding process is formed at the inner side of a battery cover part of a portable communication device by a second insert injection molding process.

As shown in FIGS. 1 to 3, the process of mounting the internal antenna 2 at the inner side of a battery cover part 1 of the portable communication device will be described below.

First, as shown in FIG. 1, in the mounting of the internal antenna 2, a metallic sheet is cut by a press process to fabricate an antenna pattern 2a, and then as shown in FIG. 2, the antenna pattern 2a is integratedly mounted in an injection-molded article 2b by a first-insert injection molding process. As shown in FIG. 3, the injection-molded article 2b mounted with the antenna pattern 2a is integratedly mounted in the battery cover part 1 of the portable communication device by a second insert injection molding process.

As described above, since it is not easy to fix the antenna pattern 2a, the conventional mounting process is divided into two steps. In other words, the process is carried out by first and second insert injection molding processes.

Figure 4:
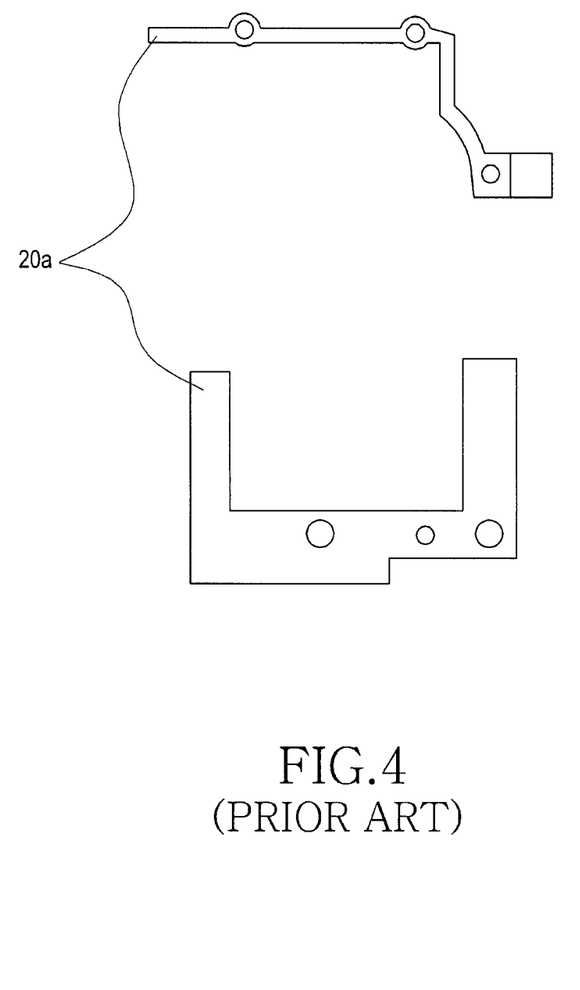
FIG. 4 is a view illustrating a conventional antenna pattern designed to be provided in a rear case of a portable communication device.
Figure 5:
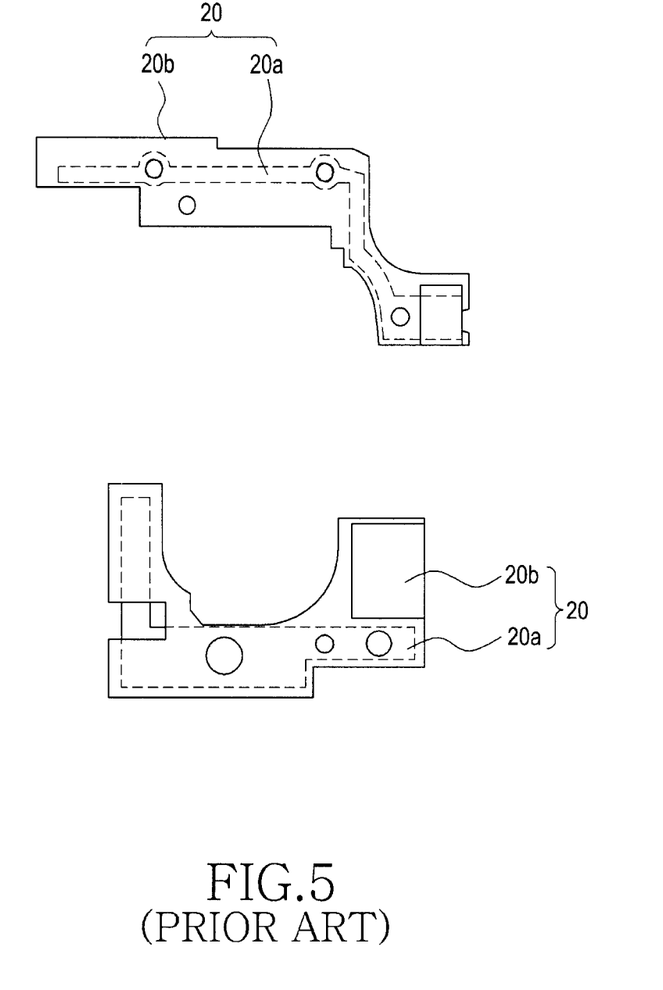
FIG. 5 is a view illustrating a state where an antenna pattern shown in FIG. 4 is formed on an injection-molded article by a first insert injection molding process that is the first part of the conventional process.
Figure 6:
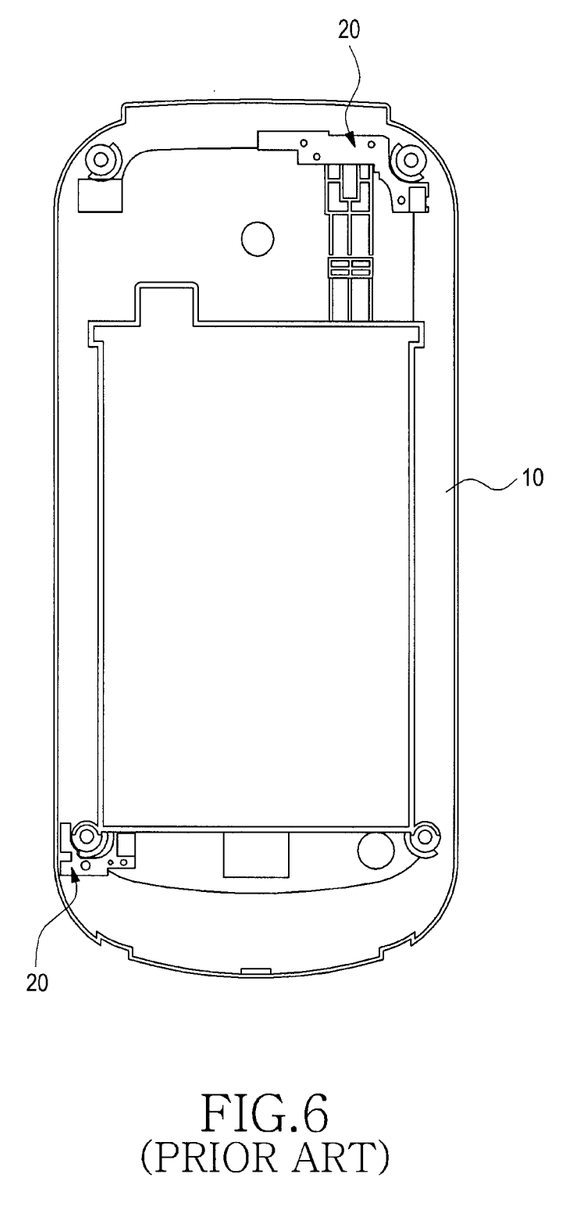
FIG. 6 is a view illustrating a state where an injection-molded article formed by a first insert injection molding process, shown in FIG. 5, is formed at the inner side of a rear case of a portable communication device by a second insert injection molding process that is the second part of the conventional process.

Also, as shown in FIGS. 4 to 6, the process of mounting the internal antenna 20 at the inner side of a rear case 10 of the portable communication device will be described below.

First, as shown in FIG. 4, in the mounting of the internal antenna 20, a metallic sheet is cut by a press process in accordance with the shape of the portable communication device so as to fabricate an antenna pattern 20a, and then as shown in FIG. 5, the antenna pattern 20a is integratedly mounted in an injection-molded article 20b by a first insert injection molding process. As shown in FIG. 6, the injection-molded article 20b mounted with the antenna pattern 20a is integratedly mounted in the rear case 10 of the portable communication device by a second insert injection molding process.

Likewise, since it is not easy to fix the antenna pattern 20a, the mounting process is divided into two steps. In other words, the process is carried out by first and second insert injection molding processes.

However, a conventional internal antenna device has a problem in that a manufacturing cost of a product is increased due to a complicated manufacturing process and an increase of a manufacturing time because an antenna pattern is fabricated by a press process and then is formed in an injection-molded article, a battery cover part, or a rear case of a communication device through first and second insert injection molding processes.

Accordingly, there is required a method for forming the antenna pattern in a battery cover part and a rear case by only one insert injection molding process, instead of a method for forming the antenna pattern in the battery cover part and the rear case by first and second insert injection molding processes.

SUMMARY OF THE INVENTION

The present invention provides an injection-molded case having antenna patterns and the manufacturing method thereof, in which antenna patterns are formed in the injection-molded case by only one (i.e. single) insert injection molding process, unlike a conventional technology where antenna patterns are formed in an injection-molded case by first insert and second insert injection molding processes. Since an additional insert injection molding process is not required, the present invention reduces a manufacturing process and a manufacturing time of a product. Also, since it is not required to manufacture an additional (i.e. second) mold, it is possible to reduce a manufacturing cost of a product.

In accordance with an exemplary aspect of the present invention, there is provided an injection-molded case having antenna patterns, the injection-molded case including: one or more antenna patterns fabricated by a press process; and an injection-molded case part having the antenna patterns provided therewithin, which is fabricated by fixing the antenna patterns on an injection mold and carrying out only one (i.e. single) insert injection molding process.

In accordance with another exemplary aspect of the present invention, there is provided a method for manufacturing an injection-molded case having antenna patterns, the method including the steps of: (a) fabricating one or more antenna patterns fabricated by a press process; and (b) fabricating an injection-molded case part having the antenna patterns provided therewithin, by fixing the antenna patterns from step (a) on an injection mold and carrying out only a single insert injection molding process.

BRIEF DESCRIPTION OF THE DRAWINGS

The above and other aspects, features and advantages of the present invention will become more apparent from the following detailed description taken in conjunction with the accompanying drawings, in which.

DETAILED DESCRIPTION

Hereinafter, preferred exemplary embodiments of the present invention will be described in detail with reference to the accompanying drawings. The exemplary embodiments and configurations disclosed and shown in the drawings herein are only exemplary preferred embodiments of the present invention. It should be understood that various modifications replacing these can exist at the time of application.

Figure 7:
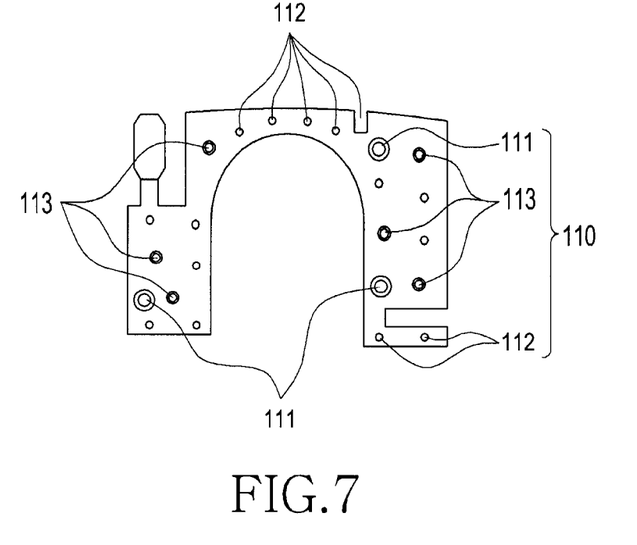
FIG. 7 is a view illustrating an antenna pattern to be configured in a battery cover part of a portable communication device, according to an exemplary embodiment of the present invention.
Figure 8:
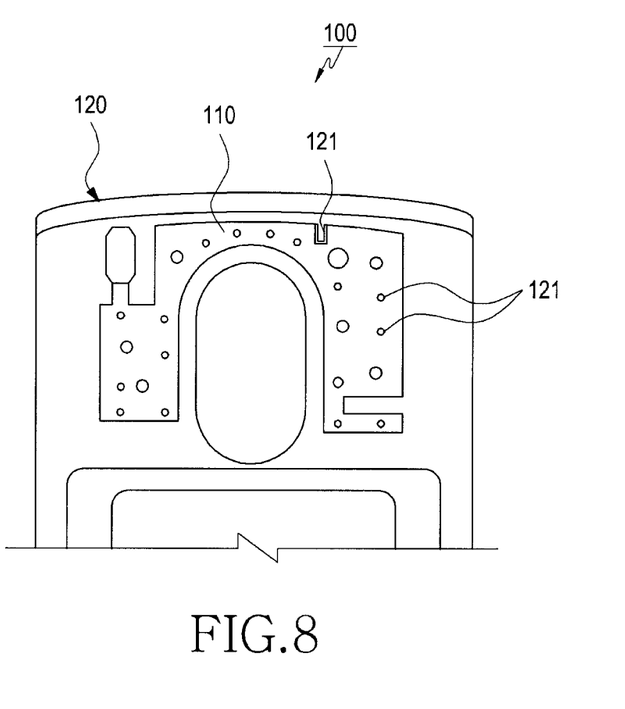
FIG. 8 is a view illustrating a state where an antenna pattern shown in FIG. 7 is provided at the inner side of a battery cover part of a portable communication device by an insert injection molding process according to the present invention.

As shown in FIGS. 7 to 17, an injection-molded case 100 provided with antenna patterns preferably includes one or more antenna patterns 110, and an injection-molded case 120 (shown in FIG. 8). The antenna patterns 110 are fabricated by a press process, and the injection-molded case 120 is provided with the antenna patterns 110 therewithin, in which the antenna patterns 110 are fixed on an injection mold 130 (FIG. 11) and subjected to an insert injection molding process.

As shown in FIGS. 7 to 10, the antenna patterns 110 preferably include one or more first fixing holes 111, one or more second fixing holes 112, and one or more third fixing holes 113. The first fixing holes 111 are formed in the antenna pattern 110 such that they can be fixedly coupled with ribs 132 or fixing protrusions formed on the injection mold 130 (FIG. 132). The second fixing holes 112 are formed preferably at positions adjacent to the first fixing holes 111 in such that they can be fixedly coupled with ribs 121 (FIG. 8) or fixing protrusions formed on the injection-molded case 120 after the insert injection molding process.

Figure 10:
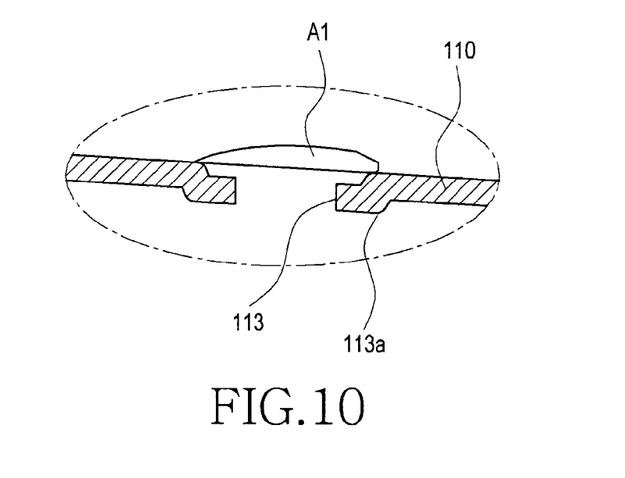
FIG. 10 is a cut-away view illustrating a third fixing hole of an antenna pattern provided at the inner side of a battery cover part of a portable communication device, according to an exemplary embodiment of the present invention.

As shown in FIG. 10, the third fixing holes 113 are formed with jaws 113a, and are formed preferably at positions adjacent to the first and second fixing holes 111 and 112 in such a manner that an injected resin A1 can be inserted into the jaws 113a after the single insert injection molding process.

The surface of the antenna patterns 110 is designed in such that after the single insert injection molding process, the resin A1 is injected to cover and fix the antenna patterns 110.

Figure 11:
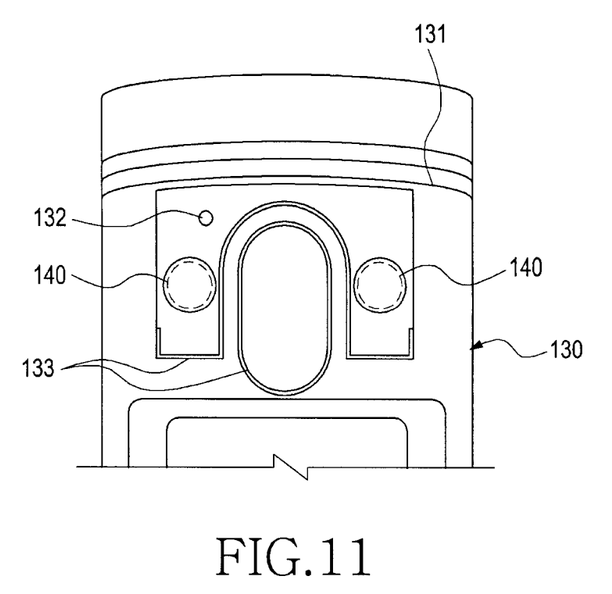
FIG. 11 is a view illustrating an injection mold of a battery cover part of a portable communication device, according to an exemplary embodiment of the present invention.

As shown in FIG. 11, in the injection mold 130, a guide rail 131 is formed. The guide rail fixes the antenna patterns 110, and during the single insert injection molding process, prevents the antenna patterns 110 from becoming loosened or displaced by the resin A1, while guiding the resin A1 in such a manner that the resin A1 can cover the antenna patterns 110. In the injection mold 130, one or more magnetic parts 140 are provided in such a manner that they can fix the antenna patterns 110 by a magnetic force so as to prevent the antenna patterns 110 from escaping during the single insert injection molding process. Also, in the injection mold 130, fixing ribs 133 are formed in order to fix and seat the antenna patterns 110.

As shown in FIG. 11, the guide rail 131 preferably includes a guide groove.

Figure 9:
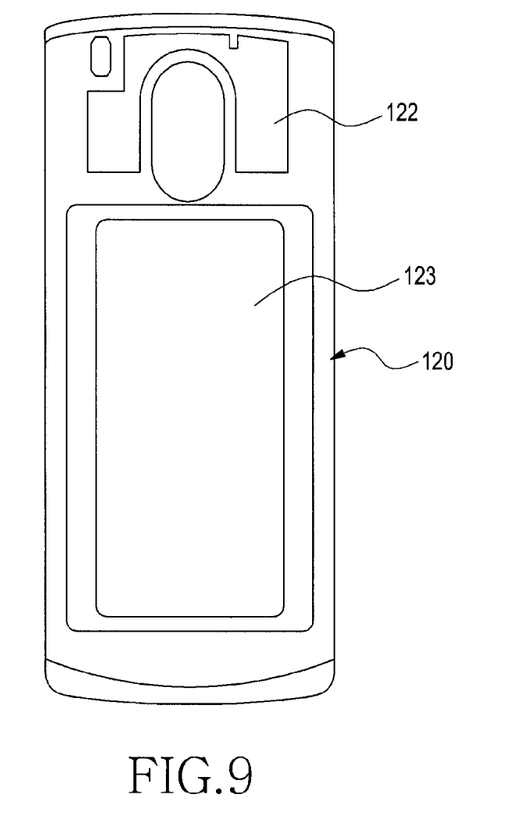
FIG. 9 is a view illustrating a state where a sheet part is attached on an antenna pattern provided at the inner side of a battery cover part of a portable communication device, according to an exemplary embodiment of the present invention.

As shown in FIGS. 8 and 9, the injection-molded case 120 includes a battery cover portion 123. Also, the injection-molded case 120 may include another cover portion beside the battery cover portion (e.g., a terminal cover portion, an earphone cover portion, etc.).

As shown in FIG. 9, on the externally exposed surface of the antenna patterns 110 provided in the battery cover portion 123, a sheet portion 122 is attached in so that the sheet portion can protect the antenna patterns 110.

The sheet portion 122 is made of a poly carbonate (PC), and may be made of another material than the PC (e.g., a silicon material, etc.)

Also, as shown in FIGS. 12 to 17, the injection-molded case includes a rear case 200 of a portable communication device. Also, the injection-molded case may include another case portion beside the rear case 200 (e.g., an upper case, etc.).

The injection-molded case is preferably configured such that by only one insert injection molding process (i.e. a single insert injection molding process), the rear case 200 is fabricated, and antenna patterns 210 are provided at the inner side of upper and lower portions of the rear case 200.

Figure 13:
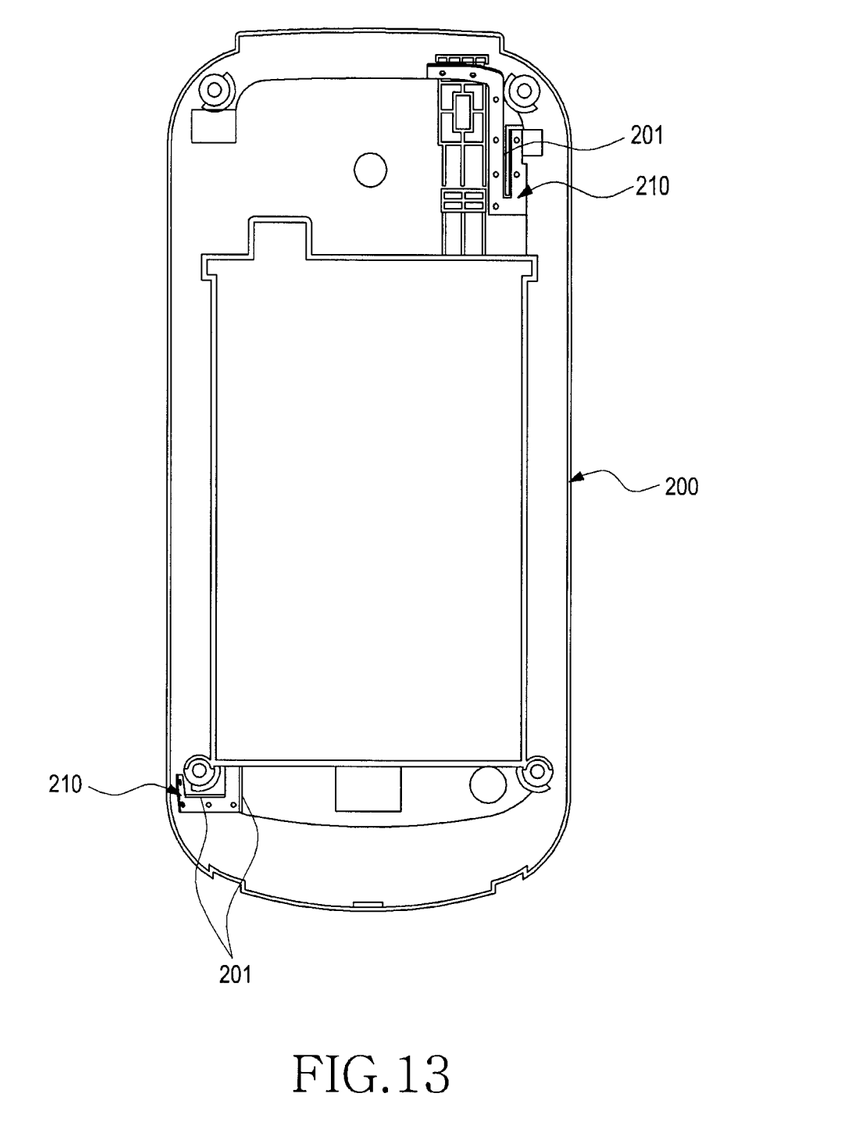
FIG. 13 is a view illustrating a state where antenna patterns shown in FIG. 12 are provided at the inner side of upper and lower portions of a rear case of a portable communication device by an insert injection molding process according to the present invention.

Referring to FIG. 13, in the rear case 200, seating ribs 201 are formed so as to seat the antenna patterns 210.

Meanwhile, according to an exemplary embodiment of the present invention, the injection-molded case 120 and 200 provided with the antenna patterns 110 and 210 representatively include the battery cover portion 123 and the rear case 200 of a portable communication device. However, the injection-molded case 120, 200 according to the present invention is not limited to the battery cover 123 and the rear case 200, and may be applied to various types of battery covers and rear cases (e.g., a bar-type portable communication device, a folder-type portable communication device, a sliding-type portable communication device, a swing-type portable communication device, etc.).

Examples of a portable communication device according to the above described exemplary embodiment of the present invention may include not only all mobile communication terminals which operate in accordance with communication protocols corresponding to various communication systems, but also all information communication devices and multimedia devices (such as a portable multimedia player (PMP), an MP3 player, a navigation device, a game device, a notebook computer, an advertisement panel, a TV, a digital broadcast player, a personal digital assistant (PDA), a smart phone, a waterproof phone), and their application devices, just to name some non-limiting examples.

Hereinafter, the operation process of an injection-molded case provided with antenna patterns according to one preferred exemplary embodiment of the present invention, with the above described configuration, will be described in more detail with reference to FIGS. 7 to 17.

As shown in FIGS. 7 to 11, the injection-molded case 100 includes one or more antenna patterns 110, and the injection-molded case 120.

As shown in FIG. 7, the antenna patterns 110 are fabricated by a press process. Herein, in the antenna patterns 110, one or more first fixing holes 111, one or more second fixing holes 112, and one or more third fixing holes 113 are formed. The first fixing holes 111 are designed to be fixedly coupled with the ribs 132 formed on the injection mold 130. The second fixing holes 112 are designed to be fixedly coupled with the ribs 121 formed on the injection-molded case 120 after the single insert injection molding process. The third fixing holes 113 are formed with the jaws 113a in such a manner that the injected resin A1 can be inserted into the jaws 113a after the insert injection molding process.

As shown in FIG. 11, the first fixing holes 111 of the antenna patterns 110 are used to fix the antenna patterns with the injection mold 130. Also, when the resin A1 comes into the injection mold 130, the magnetic force of the magnetic parts 140 provided in the injection mold 130 fix the antenna patterns 110 while preventing them from escaping. Also, the antenna patterns 100 are fixed with and seated on the fixing ribs 133 formed on the injection mold 130.

In this state, as shown in FIG. 8, by performing only one insert injection molding process (i.e. a single insert injection molding process), the injection-molded case 120 is fabricated and the antenna patterns 110 are provided at the inner side of the injection-molded case 120.

Herein, as shown in FIG. 11, the injected resin A1 comes into the injection mold 130 along the guide rail 131 formed in the injection mold 130.

The guide rail 131 prevents the antenna patterns 110 from becoming loosened by the injected resin A1, while guiding the resin A1 in such a manner that the resin R can cover the antenna patterns 110.

Herein, the ribs 121 formed on the injection-molded case 120 are fixedly coupled with the second fixing holes 112 of the antenna patterns 110.

Also, during the single insert injection molding process, the resin A1 is inserted into the jaws 113a of the third fixing holes 113 of the antenna patterns 110 and rises while fixing the antenna patterns 110.

Herein, as shown in FIG. 10, the resin A1 rises in the jaws 113a of the third fixing holes 113, thereby forming a "T" shape.

Herein, as shown in FIG. 9, the injection-molded case 120 includes a battery cover of a portable communication device. On the externally exposed surface of the antenna patterns 110 provided within the battery cover portion 123, the sheet part 122 is attached.

Also, as shown in FIGS. 12 to 17, the injection-molded case preferably includes the rear case 200 of a portable communication device. Also, in the upper and lower portions of the rear case 200, the antenna patterns 210 are provided.

Figure 12:
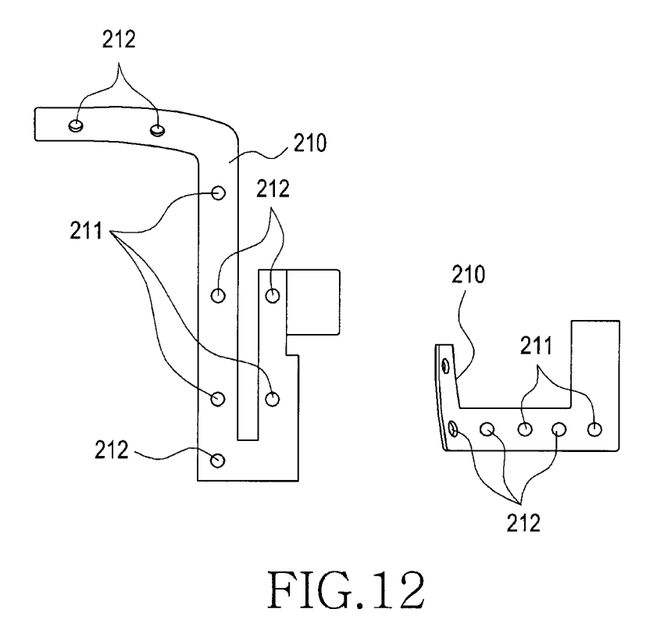
FIG. 12 is a view illustrating antenna patterns to be configured in a rear case of a portable communication device, according to an exemplary embodiment of the present invention.

Likewise, as shown in FIG. 12, the antenna patterns 210 are preferably fabricated by a press process.

Figure 16:
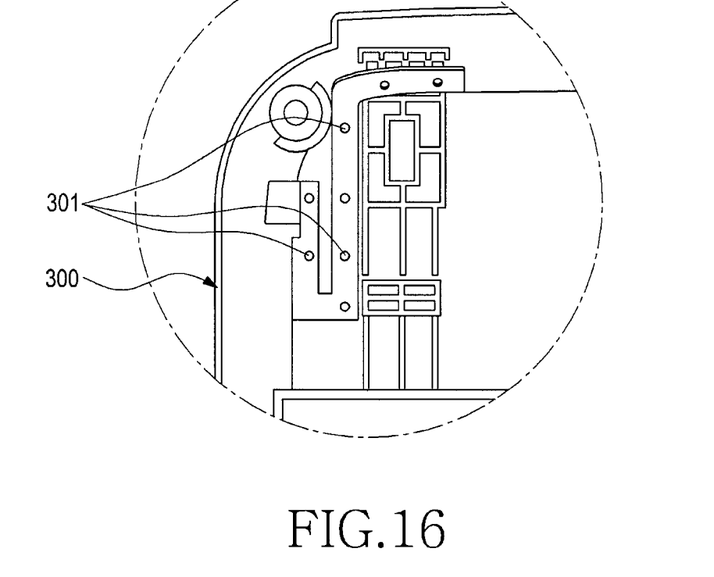
FIG. 16 is a view illustrating the upper side of an injection mold of a rear case of a portable communication device, according to an exemplary embodiment of the present invention.
Figure 17:
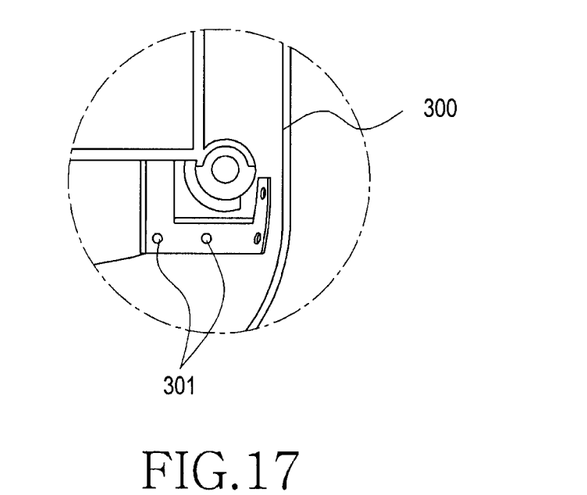
FIG. 17 is a view illustrating the lower side of an injection mold of a rear case of a portable communication device, according to an exemplary embodiment of the present invention.

Herein, as shown in FIGS. 16 to 17, in the antenna patterns 210 (such as shown in FIG. 12), one or more first fixing holes 211 are formed, which are to be fixedly coupled with the fixing protrusions 301 formed on an injection mold 300. Also, in the antenna patterns 210, one or more second fixing holes 212 are formed, which are to be fixedly coupled with fixing protrusions 202 formed on the rear case 200 after the single insert injection molding process. The first fixing holes 211 of the antenna patterns 210 are used to fix the antenna patterns with the injection mold 300.

Also, when the resin A1 comes into the injection mold 300, the magnetic force of magnetic parts (not shown) provided in the injection mold 300 fix the antenna patterns 210 while preventing them from movement.

In this state, as shown in FIGS. 13 to 17, by only one insert injection molding process, the rear case 200 is fabricated and the antenna patterns 210 are provided in the upper and lower portions at the inner side of the rear case 200.

Figure 14:
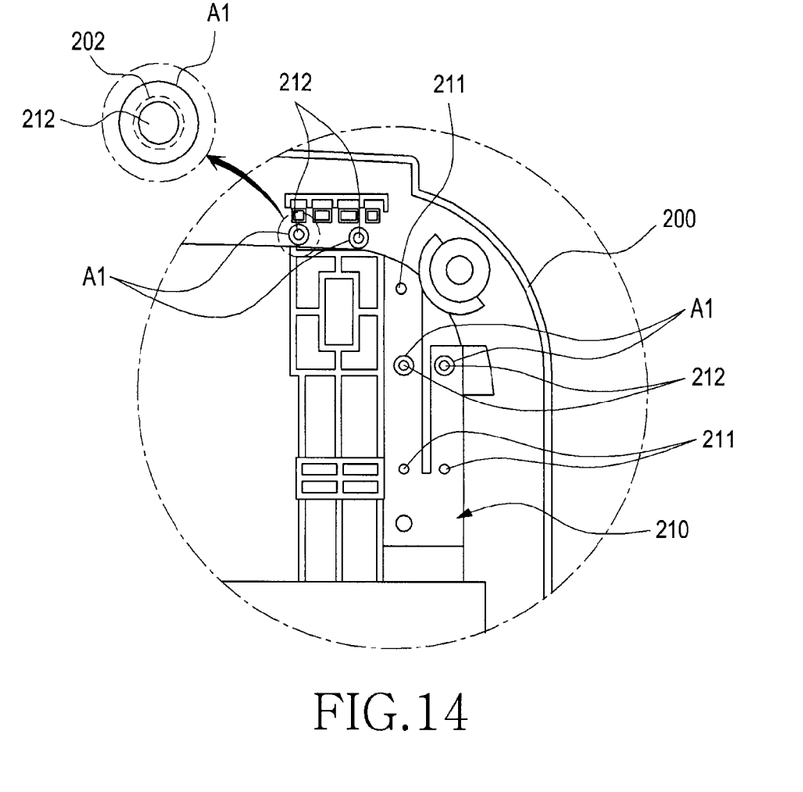
FIG. 14 is a view illustrating the inner side of an upper portion of a rear case of a portable communication device, according to an exemplary embodiment of the present invention.
Figure 15:
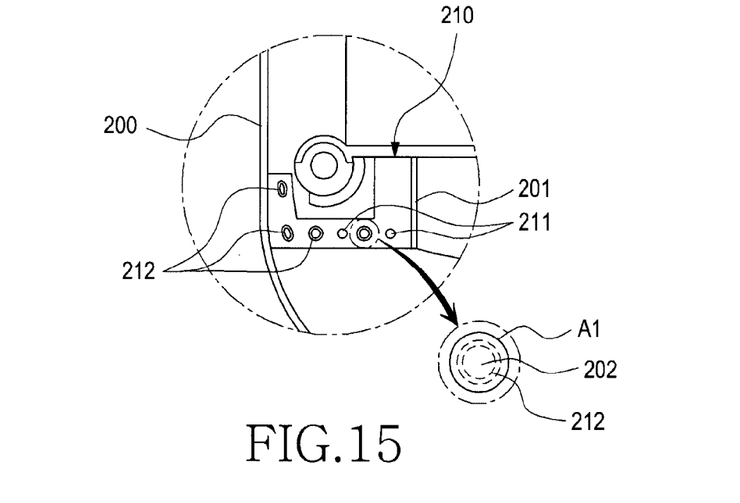
FIG. 15 is a view illustrating the inner side of a lower portion of a rear case of a portable communication device, according to an exemplary embodiment of the present invention.

Herein, as shown in FIGS. 14 to 15, the fixing protrusions 202 formed on the rear case 200 are fixedly coupled with the second fixing holes 212 of the antenna patterns 210, and the resin A1 rises and covers the surface of the second fixing holes 212.

The seating ribs 201 formed on the rear case 200 seat the antenna patterns 210 while avoiding interference with another component (not shown) of a portable communication device.

Hereinafter, the fabrication method and the operation process of an injection-molded case provided with antenna patterns according to one preferred exemplary embodiment of the present invention, with the above described configuration, will now be described in more detail with reference to FIG. 18.

Figure 18:
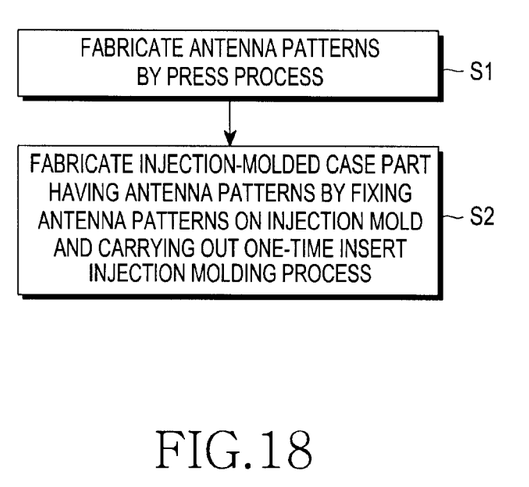
FIG. 18 is a flow diagram illustrating a method for manufacturing an injection-molded case provided with antenna patterns according to an exemplary embodiment of the present invention.

As shown in FIGS. 7 to 11, and the flowchart of FIG. 18, in the fabrication method of an injection-molded case, antenna patterns 110 are preferably fabricated by a press process in step S1.

Herein, as shown in FIG. 7, in the antenna patterns 110, one or more first fixing holes 111, one or more second fixing holes 112, and one or more third fixing holes 113 are formed. The first fixing holes 111 are designed to be fixedly coupled with the ribs 132 formed on the injection mold 130. The second fixing holes 112 are designed to be fixedly coupled with the ribs 121 formed on the injection-molded case 120 after the single insert injection molding process. The third fixing holes 113 are formed with the jaws 113a in such that the injected resin A1 (shown in FIG. 10) of injection can be inserted into the jaws 113a after the single insert injection molding process.

As shown in FIG. 11, the first fixing holes 111 of the antenna patterns 110 from S1 are used to fix the antenna patterns with the injection mold 130. Also, when the resin A1 comes into the injection mold 130, the magnetic force of the magnetic parts 140 provided in the injection mold 130 fix the antenna patterns 110 while preventing them from escaping. Also, the antenna patterns 100 are fixed with and seated on the fixing ribs 133 formed on the injection mold 130.

In this state, as shown in FIG. 8, by only one insert injection molding process (i.e. a single insert injection molding process), the injection-molded case 120 is fabricated and the antenna patterns 110 are provided at the inner side of the injection-molded case 120, in step S2.

Herein, the injected resin A1 comes into the injection mold 130 along the guide rail 131 formed in the injection mold 130.

The guide rail 131 prevents the antenna patterns 110 from becoming loosened by the injected resin A1, while guiding the resin A1 such that the resin A1 can cover the antenna patterns 110.

Herein, the ribs 121 formed on the injection-molded case 120 are fixedly coupled with the second fixing holes 112 of the antenna patterns 110.

Also, as shown in FIG. 10, during the single insert injection molding process, the resin A1 is inserted into the jaws 113a of the third fixing holes 113 of the antenna patterns 110 and rises while fixing the antenna patterns 110. Herein, the resin A1 rises in/over the jaws 113a of the third fixing holes 113, thereby forming a "T" shape.

Herein, as shown in FIG. 9, the injection-molded case 120 preferably includes a battery cover portion 123 of a portable communication device. On the externally exposed surface of the antenna patterns 110 provided within the battery cover portion 123, the sheet portion 122 is attached.

Also, as shown in FIGS. 12 to 18, the injection-molded case part includes the rear case 200 of a portable communication device. Also, in the upper and lower portions of the rear case 200, the antenna patterns 210 are provided.

Likewise, as shown in FIG. 12, one or more antenna patterns 210 are fabricated by a press process, in step S1.

Herein, as shown in FIGS. 16 to 17, in the antenna patterns 210, one or more first fixing holes 211 are formed, which are to be fixedly coupled with the fixing protrusions 301 formed on an injection mold 300. Also, in the antenna patterns 210, one or more second fixing holes 212 are formed, which are to be fixedly coupled with fixing protrusions 202 formed on the rear case 200 after the insert injection molding process.

The first fixing holes 211 of the antenna patterns 210 from step S1 are used to fix the antenna patterns with the injection mold 300.

In this state, as shown in FIGS. 13 to 15, by only one (i.e. single) insert injection molding process, in S2 the rear case 200 is fabricated and the antenna patterns 210 are provided at the inner side of the rear case 200.

Herein, as shown in FIGS. 14 to 15, the fixing protrusions 202 formed on the rear case 200 are fixedly coupled with the second fixing holes 212 of the antenna patterns 210, and the resin A1 rises over and covers the surface of the second fixing holes 212.

The seating ribs 201 formed on the rear case 200 seat the antenna patterns 210 while avoiding interference with another component (not shown) of a portable communication device.

As described above, in the present invention, antenna patterns are formed on an injection-molded case part by only one (i.e. single) insert injection molding process whereas in a conventional technology, antenna patterns are formed on an injection-molded case part by first insert and second insert injection molding processes. Thus, since an additional insert injection molding process not required, it is possible to reduce a manufacturing process and a manufacturing time. Also, since as the present invention does not require the additional manufacture of a mold, it is possible to reduce a manufacturing cost of a product.

The injection-molded case having antenna patterns and the manufacturing method thereof, according to the present invention, as described above, are not limited to the above described exemplary embodiments and drawings. It will be apparent to those skilled in the art that the exemplary embodiment of the present invention may be modified, changed, and substituted in various types of terminals (e.g., sliding-type, swing-type, and waterproof terminals) in a number of ways that are within the spirit of the invention and the scope of the appended claims.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An injection-molded case having antenna patterns, the injection-molded case comprising:
   one or more antenna patterns fabricated by a press process; and
   an injection-molded case, wherein the injection-molded case is fabricated by fixing the antenna patterns on an injection mold in a single insert injection molding process and in which a plurality of different-sized fixing holes are provided, and
   wherein the plurality of different-sized fixing holes of the one or more antenna patterns comprise:
      one or more first fixing holes formed in the antenna patterns being arranged for fixedly coupling with ribs or fixing protrusions formed on the injection mold;
      one or more second fixing holes formed at positions adjacent to the one or more: first fixing holes, in which the one or more second fixing holes are arranged for fixedly coupling with ribs or fixing protrusions formed on the injection-molded case after the single insert injection molding process; and
      one or more third fixing holes formed at positions adjacent to the first and second fixing holes in which the one or more third fixing holes are formed with jaws in such that an injected resin is inserted into the jaws after the single insert injection molding process such that the resin is arranged in and over the jaws to form a T-shape.

2. The injection-molded case as claimed in claim 1, wherein the resin is injected on a surface of the antenna patterns after the single insert injection molding process to fix the antenna patterns within the injection-molded case.

3. The injection-molded case as claimed in claim 1, wherein the injection-molded case comprises a battery cover.

4. The injection-molded case as claimed in claim 3, wherein a sheet part is attached on an externally exposed surface of the antenna patterns provided in the battery cover.

5. The injection-molded case as claimed in claim 4, wherein the sheet part is made of a poly carbonate (PC).

6. The injection-molded case as claimed in claim 1, wherein the injection-molded case comprises a rear case of a portable communication device.

7. The injection-molded case as claimed in claim 6, wherein in the rear case, seating ribs for seating the antenna patterns are formed.

* * * * *